Patented Aug. 7, 1951

2,563,073

UNITED STATES PATENT OFFICE 2,563,073

HALOALKYLATION OF THIOPHENE

Louis Schmerling, Riverside, Ill., assignor to Universal Oil Products Company, Chicago, Ill., a corporation of Delaware No Drawing. Application September 13, 1946, Serial No. 696,955

3 Claims. (Cl. 260—332.5)

This invention relates to the preparation of halogen-containing derivatives of thiophene. It is more particularly concerned with the catalytic interaction of a thiophene with a haloolefin in the presence of a haloalkylation catalyst.

I have found that thiophene can be easily and economically converted into valuable haloalkyl derivatives by condensation with haloolefins. Similarly, certain substituted thiophenes such as alkyl thiophenes can be converted into halogen-containing derivatives by the same reaction. These haloalkyl thiophenes are useful as intermediates in organic synthesis and in the production of germicides, medicinals, insecticides, and the like.

In one embodiment my invention relates to a process which comprises reacting a haloalkylatable thiophene with a haloolefin at haloalkylating conditions in the presence of a haloalkylation catalyst.

A thiophene which is convertible into a haloalkyl thiophene by my process contains at least one hydrogen atom bound to the heterocyclic ring of four carbon atoms and one sulfur atom. The different haloalkylatable thiophenes may be represented by the formula:

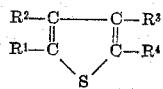

in which at least one of the groups $R^1$, $R^2$, $R^3$ and $R^4$ is a hydrogen atom and the other R groups are selected from the group consisting of hydrogen, alkyl, cycloalkyl, aryl, aralkyl, alkaryl, and naphthyl radicals. The foregoing compounds which contain at least one substitutable hydrogen atom in the ring may also contain an alkoxy, alkylthio, or similar radicals attached to the ring.

The haloalkylating agents utilizable in this process comprise monohalopropenes, -butenes, and higher monohaloolefins including monohalocycloolefins. Polyhaloolefins such as 1,2-dihalo-1-propene, 1,2-dihalo-2-propene and 1,3-dihalo-2-methyl-1-propene also may be used. The halogen in these compounds may be chlorine, bromine, iodine, or fluorine, although chloroolefins are preferred because they usually react more readily and selectively and because of their lower cost and generally greater availability. Structure also influences the reactivity of the haloolefins and it has been observed that in general those that contain a tertiary carbon atom, particularly an unsaturated tertiary carbon atom, are the more reactive.

The catalysts which may be used in this process consist of those acid-acting substances that catalyze the halo-alkylation of thiophenes containing at least one substitutable nuclear hydrogen with haloolefins. Such catalysts include unmodified metal halides of the Friedel-Crafts type such as aluminum chloride, ferric chloride, stannic chloride, zinc chloride, bismuth chloride, and the like; Friedel-Crafts metal halides dissolved in a suitable solvent such as stannic chloride dissolved in nitromethane or nitroethane; Friedel-Crafts metal halide-hydrocarbon complexes such as are prepared by reacting aluminum chloride with ethylene; solid catalyst comprising an active metal halide deposited on a support such as activated charcoal, alumina, fire brick, etc.; and addition complexes of alcohols, ethers, and ketones with a Friedel-Crafts metal halide such as aluminum chloride monomethanolate. Other catalysts include the acids of pentavalent phosphorus, particularly the ortho and pyro types, alone or deposited upon adsorbents or carriers of a siliceous character; alkaline earth acid phosphates such as the dihydrophosphates of calcium, strontium, and barium; cupric orthophosphate or a material formed by calcining hydrated cupric orthophosphate at a temperature within the range of from about 200° to about 400° C.; a salt or an acid salt of an acid of phosphorus and a material selected from the members of the right hand column of group II of the periodic table; liquid mixtures of sulfuric and phosphoric acids containing less than about 75% sulfuric acid, and sulfuric acid dissolved in acetic acid. Still other catalysts include boron fluoride, boron fluoride-ethyl ether complex, and mixtures of boron fluoride in water, said mixtures preferably containing a molecular excess of water. In general these catalysts can be separated into three groups, i. e., those containing metal halides, those containing mineral acids, and those containing boron and fluorine. These catalysts exhibit different degrees of potency, but all of them will catalyze the interaction of thiophenes and haloolefins under suitable conditions of time, temperature, and pressure. For example, aluminum chloride is considerably more active than aluminum chloride monomethanolate and tends to give high molecular weight condensation products at conditions at which the complex catalyst gives monohaloalkyl thiophene. However, at low temperatures even aluminum chloride will yield monohaloalkyl thiophene.

The process of my invention may be carried out in batch operation by placing a quantity of the catalyst in a reactor equipped with a stirring device, adding the thiophene, heating or cooling to a reaction temperature, slowly adding the haloolefin while mixing the contents of the reactor, and recovering the haloalkyl thiophene. However, the preferred method of operation is of the continuous type. If the haloalkylation catalyst is liquid it is continuously charged to a reactor together with the thiophene and a haloalkylating agent. The reactor effluent is passed to a settler wherein a separation is effected between the catalyst phase and the thiophene phase. At least a portion of the catalyst phase is continuously recycled to the reaction zone and the thiophene phase is processed for recovery of the desired products. If the haloalkylation catalyst is a solid it may be disposed as a fixed bed within a reactor and the reactants continuously passed through the bed at haloalkylation conditions. The haloalkylate in the effluent is recovered and the unreacted haloolefins and thiophene may be separated and recycled to the haloalkylation step for further reaction.

The solid catalysts mentioned herein may be used in the finely divided state in a "fluidized" type of operation. In this method of operation the charge is passed upwardly through a bed of finely divided catalysts causing the catalyst particles to be motionalized and forming a fluid-like mass. The catalyst is intermittently or continuously withdrawn from the reaction zone, regenerated, and returned thereto. Another type of operation employing solid catalyst is the "moving bed" operation wherein a compact bed of catalyst is continuously passed through the reaction zone concurrently or countercurrently to the incoming reactants and passed therefrom into a regeneration zone from which it is returned to the reaction zone after having been regenerated. Another alternative mode of operation comprises suspending finely divided solid catalyst in the stream of charge stock and treating said suspension under suitable conditions of temperature and pressure to produce the desired reaction.

The process of this invention may be conducted at temperatures within the range of from about —20° C. to about 175° C. The preferred temperature will depend upon the particular thiophene and haloolefin being charged to the process and upon the activity of the particular haloalkylation catalyst being employed. The pressure should be such that substantially all of the reactants are in the liquid phase. In general these pressures will lie within the range of from about 1 to about 100 atmospheres. When a liquid catalyst is used, the contact time may be in the range of from about 3 minutes to about 3 hours. If a solid catalyst is used in a fixed bed, the liquid hourly space velocity, defined as the volume of total feed to the reaction zone divided by the superficial volume of the catalyst in said zone, should be in the range of from about 0.1 to about 10. A molecular excess of the thiophene over the haloolefin in the reaction zone promotes haloalkylation of the thiophene and suppresses undesirable side reactions.

The following example is given to illustrate my invention but it is not introduced with the intention of unduly limiting the generally broad scope of said invention.

EXAMPLE

The operating conditions and results of a number of experiments using various thiophenes, haloolefins, and catalysts are shown in the following table. The experiments usually were carried out by placing the thiophene and catalyst in a flask equipped with a stirrer, heating or cooling to the reaction temperature, and then adding the haloolefin gradually to the stirred mixture, diluting the contents of the flask with water after reaction periods of 1–4 hours, separating the catalyst layer, neutralizing, washing, and drying the organic material, and analyzing the products.

Table

| Experiment No. | 1 | 2 | 3 | 4 | 5 | 6 | 7 | 8 |
|---|---|---|---|---|---|---|---|---|
| Catalyst: | | | | | | | | |
| Kind | Ethyl Ether $BF_3$ Complex. | Ethyl Ether $BF_3$ Complex. | $BF_3$ $2.2H_2O$ | 85% $H_3PO_4$[1] | $SnCl_4$ | Ethyl Ether $BF_3$ Complex. | Ethyl Ether $BF_3$ Complex. | Ethyl Ether $BF_3$ Complex. |
| Quantity, grams | 17 | 68 | 15 | 15 | 15 | 20 | 15 | 15. |
| Thiophene, grams | 75.6 | 420 | 75.6 | 75.6 | 75.6 | 75.6 | Methyl thiophene 81.5. | 75.6. |
| Haloolefin: | | | | | | | | |
| Kind | Methallyl-Chloride. | Methallyl-Chloride. | Methallyl-Chloride. | Methallyl-Chloride. | Methallyl-Chloride. | Allyl Bromide. | Methallyl-Chloride. | 1,3-Dichloro-2-methyl-1-propene. |
| Weight, g | 36.2 | 226 | 39.3 | 36.2 | 39.3 | 25.0 | 22.5 | 25.0 |
| Temperature, °C | 80 | 80 | 58 | 125 | —4.0 | 80 | 66 | 80. |
| Haloalkylthiophene: | | | | | | | | |
| Mono, g | 24.5 | 173.6 | 30.1 | 1.0 | 2.7 | 16.5 | 33.7 | 22.0. |
| Bis, g | 5.5 | 42.2 | | 4.0 | 2.2 | 3.0 | | |

[1] Carried out in a rotating autoclave, the mixture of reactants and catalyst being treated for four hours.

It can be seen that in all cases haloalkylation of the thiophene took place although the yield varied to some extent with the particular catalyst and haloolefin employed.

A low temperature, e. g. below 0° C., is generally used with very active unmodified metal halide catalysts such as stannic chloride or aluminum chloride because at higher temperatures there is substantial interaction of the primary condensation product (i. e., the haloalkylthiophene) with thiophene or with itself to yield high-boiling oils or resins. In some cases, these resins are useful products.

The product of the reaction of one mole of methallyl chloride with one of thiophene boils at about 63–66° at 2 mm. and has a refractive index, $n_D^{20}$, of 1.533. It is 2-(beta-chloro-t-butyl)-thiophene.

The product of the reaction of equal moles of 1,3-dichloro-2-methyl-1-propene and thiophene is 1,3-dichloro-2-methyl-2-(2-thienyl)-propane, B. P., about 100–105° C. at 4 mm.

Condensation of thiophene with allyl bromide yields 2-(beta-bromoisopropyl)-thiophene, B. P., about 102–104° at 13 mm. pressure.

I claim as my invention:

1. A process for producing a chlorobutyl thiophene which comprises contacting a thiophene containing at least one hydrogen atom bound to the heterocyclic ring of four carbon atoms and one sulfur atom with methallyl chloride, the thiophene being in molecular excess over the methallyl chloride, in the presence of a boron fluoride complex catalyst selected from the group consisting of boron fluoride hydrate and boron fluoride ethyl ether complex at a chloroalkylation temperature within the range of from about −20° C. to about 175° C. and a pressure such that substantially all of the reactants are in the liquid phase.

2. A process for producing 2-(beta-chloro-t-butyl)-thiophene which comprises contacting thiophene with methallyl chloride, the thiophene being in molecular excess over the methallyl chloride, in the presence of hydrated boron fluoride catalyst at a chloroalkylation temperature within the range of from about −20° C. to about 175° C. and a pressure such that substantially all of the reactants are in the liquid phase.

3. A process for producing 2-(beta-chloro-t-butyl)-thiophene which comprises contacting thiophene with methallyl chloride, the thiophene being in molecular excess over the methallyl chloride, in the presence of boron fluoride ethyl ether complex catalyst at a chloroalkylation temperature within the range of from about −20° C. to about 175° C. and a pressure such that substantially all of the reactants are in the liquid phase.

LOUIS SCHMERLING.

REFERENCES CITED

The following references are of record in the file of this patent:

UNITED STATES PATENTS

| Number | Name | Date |
| --- | --- | --- |
| 2,141,611 | Malishev | Dec. 27, 1938 |

FOREIGN PATENTS

| Number | Country | Date |
| --- | --- | --- |
| 453,422 | Great Britain | Sept. 4, 1936 |

OTHER REFERENCES

Richter: Organic Chemistry, 649–650, Wiley, N. Y., 1938.

Alles, J. Pharm. and Exp. Ther. 72, 265 (1941).

Beilstein, Handbuch der Organischen Chemie, vol. 5, 2nd supplement, 1943, page 320.